(12) United States Patent
Han

(10) Patent No.: US 12,326,035 B2
(45) Date of Patent: Jun. 10, 2025

(54) VEHICLE-MOUNTED DRAWER SAFE BOX

(71) Applicant: Yanni Han, Nanjing (CN)

(72) Inventor: Yanni Han, Nanjing (CN)

(73) Assignee: Guangzhou Lunshang Anfang Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/023,429

(22) Filed: Jan. 16, 2025

(65) Prior Publication Data
US 2025/0154820 A1    May 15, 2025

(51) Int. Cl.
| B60R 7/04 | (2006.01) |
| B60R 11/00 | (2006.01) |
| E05B 65/00 | (2006.01) |
| E05G 1/026 | (2006.01) |
| E05G 1/04 | (2006.01) |

(52) U.S. Cl.
CPC ............... *E05G 1/04* (2013.01); *B60R 7/04* (2013.01); *E05B 65/0075* (2013.01); *E05G 1/026* (2013.01); *B60R 2011/0096* (2013.01)

(58) Field of Classification Search
CPC ... B60R 7/04; B60R 7/087; B60R 2011/0019; B60R 2011/0029; B60R 2011/0096; B60P 3/03; E05G 1/02; E05G 1/026; E05G 1/04; E05B 17/002; E05B 17/14; E05B 17/42; E05B 17/18; E05B 17/185; E05B 17/188; E05B 65/0075
USPC ........................................ 296/24.37; 224/275
See application file for complete search history.

(56) References Cited

U.S. PATENT DOCUMENTS

| 3,527,176 | A | * | 9/1970 | Losapio | E05G 1/005 |
| | | | | | 109/57 |
| 4,058,993 | A | * | 11/1977 | Stubbings | E05C 19/003 |
| | | | | | 70/58 |
| 4,079,604 | A | * | 3/1978 | Anderegg | B60R 11/0205 |
| | | | | | 70/58 |
| 4,524,904 | A | * | 6/1985 | Masse | B60R 7/087 |
| | | | | | 232/7 |
| 4,878,706 | A | * | 11/1989 | Novikov | B60R 7/02 |
| | | | | | 296/76 |
| 4,986,589 | A | * | 1/1991 | McNew | B60R 7/04 |
| | | | | | 296/37.14 |
| 6,644,523 | B1 | * | 11/2003 | Salas | B60R 7/043 |
| | | | | | 224/281 |
| 8,020,416 | B2 | * | 9/2011 | Talmage | E05G 1/00 |
| | | | | | 109/59 R |
| 10,577,063 | B2 | * | 3/2020 | Schalla | B65D 77/20 |
| 10,612,270 | B1 | * | 4/2020 | Wu | E05B 17/183 |

(Continued)

*Primary Examiner* — Gregory A Blankenship

(57) ABSTRACT

A vehicle-mounted drawer safe box includes an accommodating box body, a drawer and a mounting element. The drawer is provided with a storage space for accommodating an item and a storage opening communicated to the storage space; the drawer is slidably connected to the accommodating box body and moves between a first position. The mounting element is fixedly connected to the accommodating box body, and the mounting element is configured to be fixedly mounted in the motor vehicle. By the arrangement of the above structure, during use, the vehicle-mounted drawer safe box provides a relatively safe storage space inside a vehicle through the proper design of the accommodating box body and the drawer, as well as the reliable mounting element.

13 Claims, 11 Drawing Sheets

(56) References Cited

U.S. PATENT DOCUMENTS

| | | | |
|---|---|---|---|
| 10,625,679 B1* | 4/2020 | Wurzer | B60R 7/08 |
| 11,554,722 B1* | 1/2023 | Mothersele | F41C 33/06 |
| 12,187,230 B1* | 1/2025 | Squicciarini | B60R 7/04 |
| 2004/0149791 A1* | 8/2004 | Tuel, Jr. | B60R 7/043 |
| | | | 224/42.11 |
| 2007/0194582 A1* | 8/2007 | Arbaugh | B60R 7/04 |
| | | | 296/37.8 |
| 2007/0241584 A1* | 10/2007 | Williamson | B60R 7/043 |
| | | | 296/95.1 |
| 2010/0078954 A1* | 4/2010 | Liu | B60N 2/793 |
| | | | 296/37.8 |
| 2016/0186405 A1* | 6/2016 | Takada | E02F 3/3622 |
| | | | 414/723 |
| 2019/0152401 A1* | 5/2019 | Gargano | B60R 7/04 |
| 2019/0176675 A1* | 6/2019 | Lysik | B60R 25/01 |
| 2020/0055423 A1* | 2/2020 | Prozzi | B60R 7/04 |
| 2020/0254936 A1* | 8/2020 | Razvi | B60R 7/04 |
| 2020/0331397 A1* | 10/2020 | Sturza | B60N 2/366 |
| 2021/0016716 A1* | 1/2021 | Mcloughlin | B60R 5/003 |
| 2022/0010599 A1* | 1/2022 | Dalton | B60R 7/06 |
| 2022/0176882 A1* | 6/2022 | Smolik | B60R 11/00 |
| 2022/0242323 A1* | 8/2022 | Bork | B60N 2/0244 |
| 2022/0266755 A1* | 8/2022 | Matthews | E05B 73/00 |
| 2022/0289113 A1* | 9/2022 | Salter | B60R 25/01 |
| 2023/0249624 A1* | 8/2023 | Bastiyali | B60R 11/02 |
| | | | 296/37.8 |
| 2023/0249645 A1* | 8/2023 | Bastiyali | B60R 25/209 |
| | | | 701/2 |

\* cited by examiner

VEHICLE-MOUNTED DRAWER SAFE BOX

TECHNICAL FIELD

The present invention relates to the technical field of safe boxes, and in particular, to a vehicle-mounted drawer safe box.

BACKGROUND OF THE INVENTION

With the development of the economy, the living standard gets higher and higher. With the popularity of automobiles and the improvement of the living standards, people like to place more and more valuables, such as cash and certificates, in vehicles. However, most existing vehicle-mounted safe boxes have some shortcomings. For example, in a limited space inside a vehicle, its mounting position may affect the spatial layout and convenience of use in the vehicle. In addition, opening methods for some safe boxes is complex, or doors of safe boxes may be accidentally opened due to vibrations or other reasons during running of vehicles, which poses a safety hazard. Therefore, it is necessary to research and develop a vehicle-mounted safe box to solve the above problems.

Therefore, the present invention provides a vehicle-mounted drawer safe box with a simple structure. This safe box can be mounted on a lower guide rail of a front seat of a vehicle, or can be mounted below a seat or on a wall, close to a rear seat, in a motor vehicle. This can effectively solve the above problems.

SUMMARY OF THE INVENTION

In order to overcome the shortcomings of the prior art, the present invention provides a vehicle-mounted drawer safe box with a simple structure. This safe box can be mounted on a lower guide rail of a front seat of a vehicle, or can be mounted below a seat or on a wall, close to a rear seat, in a motor vehicle. This can effectively solve the above problems.

The technical solution adopted by the present invention to solve the technical problem is as follows.

A vehicle-mounted drawer safe box, configured to be mounted in a motor vehicle to form a safe storage space inside the vehicle, which includes an accommodating box body, a drawer and a mounting element. The accommodating box body is provided with an accommodating cavity and an accommodating opening communicated to the accommodating cavity. The drawer is provided with a storage space for accommodating an item and a storage opening communicated to the storage space; the drawer is slidably connected to the accommodating box body and moves between a first position and when the drawer is in the first position, the storage opening is configured to allow the item to pass through and enter the storage space; when the drawer is in the second position, the storage opening is closed by the accommodating box body. The mounting element is fixedly connected to the accommodating box body, and the mounting element is configured to be fixedly mounted in the motor vehicle.

As an improvement of the present invention, the mounting element includes a mounting plate and a mounting hole; the motor vehicle includes a seat guide rail and a mounting base; a lower end surface of the mounting plate is configured to abut against the mounting base, and an upper end surface of the mounting plate is configured to abut against the seat guide rail; and the mounting hole is matched with the mounting structure of the seat guide rail, so that when the seat guide rail is fixedly connected to the mounting base, the vehicle-mounted drawer safe box is fixedly mounted between the seat guide rail below a seat of the motor vehicle and the mounting base.

As an improvement of the present invention, the mounting element includes a mounting plate and a mounting hole; the motor vehicle includes a mounting plane; the mounting plate is configured to abut against the mounting plane; a size of the mounting hole is matched with a size of a mounting fastener, so that the vehicle-mounted drawer safe box is fixedly mounted on the mounting plane of the motor vehicle.

As an improvement of the present invention, the mounting plane is arranged below the seat or on a wall, close to a rear seat, in the motor vehicle.

As an improvement of the present invention, the vehicle-mounted drawer safe box further includes a sliding rail assembly, the drawer is slidably connected to the accommodating box body through the sliding rail assembly.

As an improvement of the present invention, the drawer includes a drawer bottom wall, a first side wall, a second side wall, a third side wall, and a fourth side wall; the accommodating box body includes a box body top wall, a box body bottom wall, a fifth side wall, a sixth side wall, and a seventh side wall. The sliding rail assembly includes a first sliding rail assembly and a second sliding rail assembly. The first sliding rail assembly and the second sliding rail assembly are symmetrically arranged on the first side wall and the third side wall; and the drawer and the accommodating box body are slidably connected through the first sliding rail assembly and the second sliding rail assembly.

As an improvement of the present invention, the first sliding rail assembly includes a first drawer sliding rail and a first fixed sliding rail. The second sliding rail assembly includes a second drawer sliding rail and a second fixed sliding rail. The first side wall is fixedly connected to the first drawer sliding rail. The third side wall is fixedly connected to the second drawer sliding rail. The fifth side wall is fixedly connected to the first fixed sliding rail. The sixth side wall is fixedly connected to the second fixed sliding rail. The first side wall is slidably connected to the fifth side wall through the first drawer sliding rail and the first fixed sliding rail. The third side wall is slidably connected to the sixth side wall through the second drawer sliding rail and the second fixed sliding rail.

As an improvement of the present invention, the vehicle-mounted drawer safe box further includes threaded fasteners, the first side wall is fixedly connected to the first drawer sliding rail through the threaded fastener, and the third side wall is fixedly connected to the second drawer sliding rail through the threaded fastener.

As an improvement of the present invention, the fifth side wall is fixedly connected to the first fixed sliding rail through a threaded fastener, and the sixth side wall is fixedly connected to the second fixed sliding rail through a threaded fastener.

As an improvement of the present invention, the first sliding rail assembly further includes a first intermediate sliding rail; the second sliding rail assembly further includes a second intermediate sliding rail; the first drawer sliding rail and the first fixed sliding rail are slidably connected through the first intermediate sliding rail; and the second drawer sliding rail and the second fixed sliding rail are slidably connected through the second intermediate sliding rail.

As an improvement of the present invention, the vehicle-mounted drawer safe box further includes a locking assembly, the locking assembly includes a locking piece and a locking slot; and the locking piece and the locking slot cooperate with each other to keep the drawer in a locked state or an unlocked state at the second position.

As an improvement of the present invention, the locking piece is arranged on the second side wall; and the locking slot is arranged on the box body top wall.

As an improvement of the present invention, the locking assembly further includes a control lock cylinder. The control lock cylinder is configured to control rotation of the locking piece between a locking position and an unlocking position.

As an improvement of the present invention, the vehicle-mounted drawer safe box further includes an unlocking system, the unlocking system controls the locking piece to rotate between the locking position and the unlocking position by controlling the control lock cylinder.

As an improvement of the present invention, the unlocking system includes a fingerprint unlocking assembly and a mechanical unlocking assembly; and both the fingerprint unlocking assembly and the mechanical unlocking assembly independently control the locking piece to rotate between the locking position and the unlocking position by controlling the control lock cylinder.

As an improvement of the present invention, the fingerprint unlocking assembly includes a fingerprint recognition assembly and an unlocking knob; the unlocking knob includes a rotatable state and a locked state; the fingerprint recognition assembly is configured to control the unlocking knob to switch between the rotatable state and the locked state. When the unlocking knob is in the rotatable state, the unlocking knob controls the locking piece to rotate between the locking position and the unlocking position. When the unlocking knob is in the locked state, the unlocking knob does not control the locking piece to rotate between the locking position and the unlocking position.

As an improvement of the present invention, the mechanical unlocking assembly includes a mechanical lock hole and a hidden lock cover; the mechanical lock hole is provided inside the unlocking knob. The hidden lock cover is configured to hide the mechanical lock hole.

As an improvement of the present invention, a clamping slot is provided in the unlocking knob. The clamping slot is symmetrically arranged around the mechanical lock hole. The hidden lock cover is provided with a clamping plate; the clamping plate corresponds to the clamping slot; and the clamping slot is in clamping connection with the clamping plate to cover the hidden lock cover and hide the mechanical lock hole.

As an improvement of the present invention, the unlocking knob is further provided with a cover separation hole. The mechanical unlocking assembly further includes a cover separation ejector pin; the cover separation hole is arranged at a bottom of the clamping slot; when the clamping slot is in clamping connection with the clamping plate, the cover separation ejector pin is used to pass through the cover separation hole and apply a pressure to the clamping plate to release the hidden lock cover from a clamped state.

As an improvement of the present invention, the vehicle-mounted drawer safe box further includes a grip, the grip is fixedly connected to an outer side of the second side wall.

Beneficial effects of the present invention are as follows. By the arrangement of the above structure, during use, the vehicle-mounted drawer safe box provides a relatively safe storage space inside a vehicle through the proper design of the accommodating box body and the drawer, as well as the reliable mounting element. In a daily use scenario of the vehicle, damage to the item caused by shaking and collision during movement of the vehicle can be effectively prevented. Meanwhile, a risk of stealing can be also prevented, so that the safety of valuables in the vehicle is ensured. Compared with some traditional vehicle-mounted storage devices that have fixed shapes and are inconvenient to access, due to the drawer design, the drawer safe box can adapt more flexibly to a limited space inside the vehicle. Without occupying an extra space, the drawer safe box is cleverly embedded in an appropriate position, thus achieving a safe storage function without significantly affecting the overall space layout inside the vehicle and the riding comfort. The drawer design further facilitates a user to quickly and conveniently take and place the items. Compared with some storage boxes that are opened only by complex operations or storage spaces that are at fixed positions and are difficult to reach, this structure allows the user to easily take or place the item when the item is needed, thereby improving the efficiency and experience of daily use.

BRIEF DESCRIPTION OF DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work. In addition, the accompanying drawings are not drawn to a scale of 1:1, and the relative dimensions of the various elements are only shown as examples in the diagrams, not necessarily drawn to a true scale.

The present invention is further described below in detail in combination with the accompanying drawings and embodiments.

DETAILED DESCRIPTION OF THE INVENTION

Figure 1:
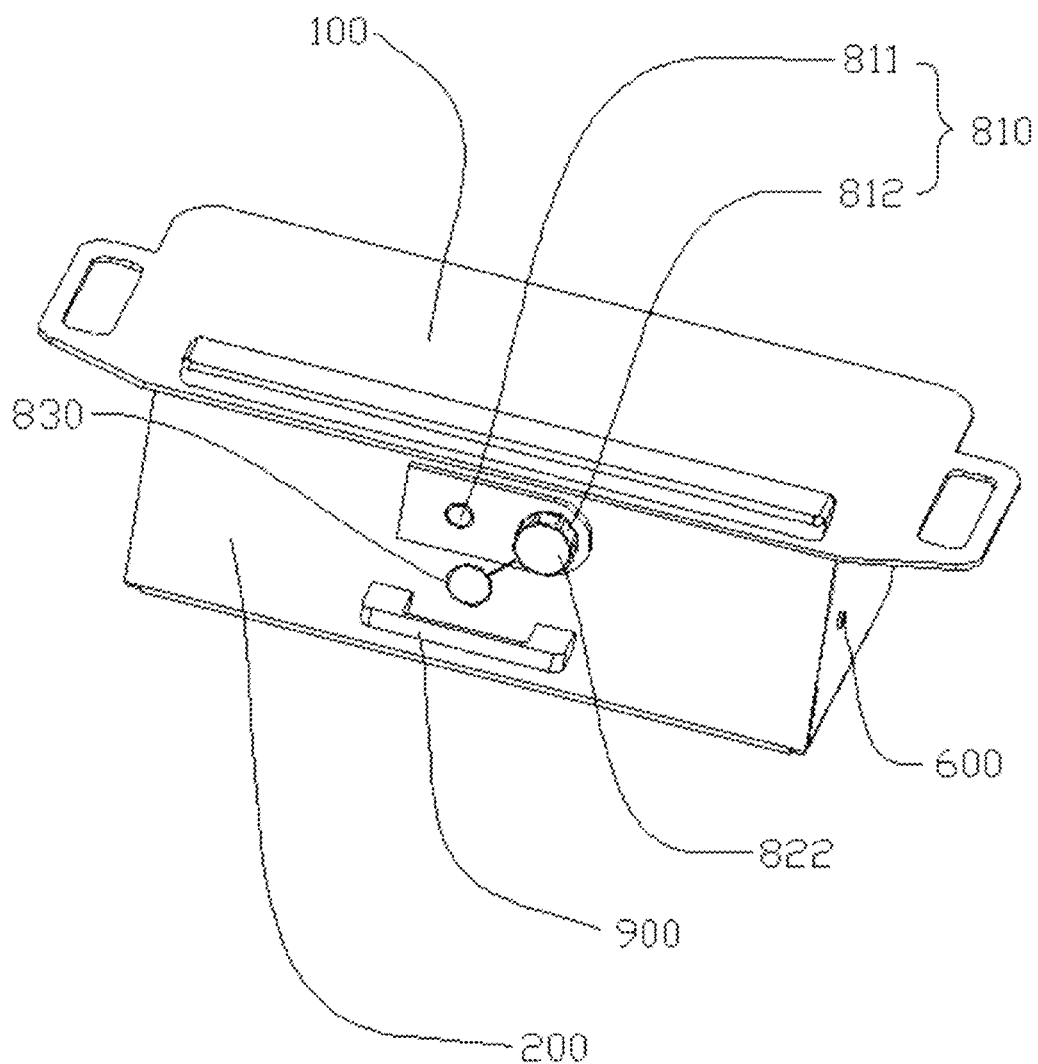
FIG. 1 is a schematic diagram of an entire structure according to Embodiment 1 of the present invention.

To make the aforementioned objectives, features, and advantages of the present invention more comprehensible, specific implementations of the present invention are described in detail below in conjunction with the accompanying drawings. In the following description, numerous specific details are set forth to provide a thorough understanding of the present invention. The present invention may, however, be embodied in many forms different from that described here. A person skilled in the art can make similar improvements without departing from the connotation of the present invention. Therefore, the present invention is not limited by the specific embodiments disclosed below.

In the description of the present invention, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present invention and simplifying the description, Rather than indicating or implying that the indicated device or element must have a particular orientation, be constructed and operated in a particular orientation, therefore, not to be construed as limiting the present invention.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present invention, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present invention can be understood based on specific circumstances.

In the present invention, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Figure 2:
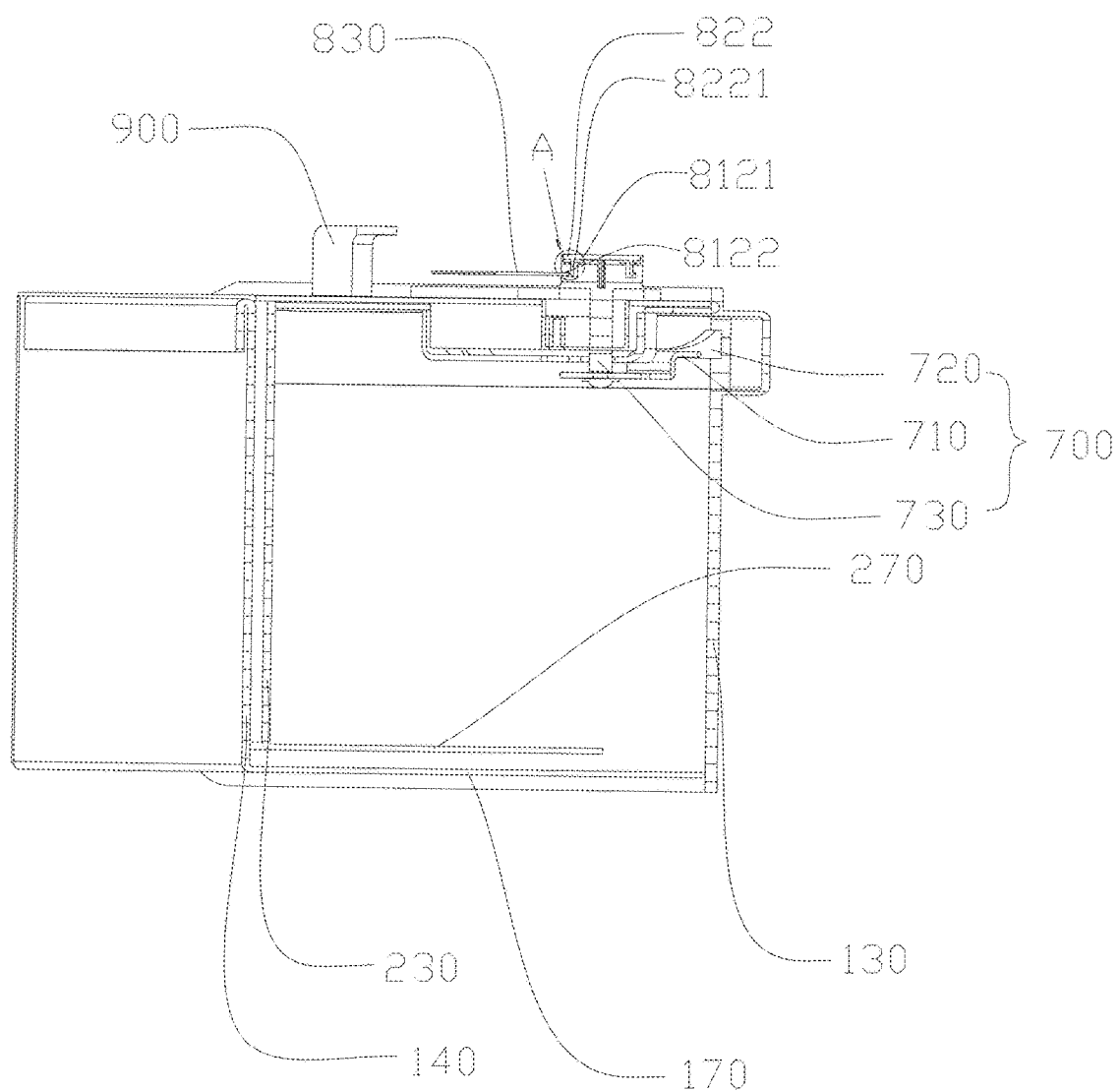
FIG. 2 is a schematic diagram of a cross-sectional structure according to Embodiment 1 of the present invention.
Figure 3:
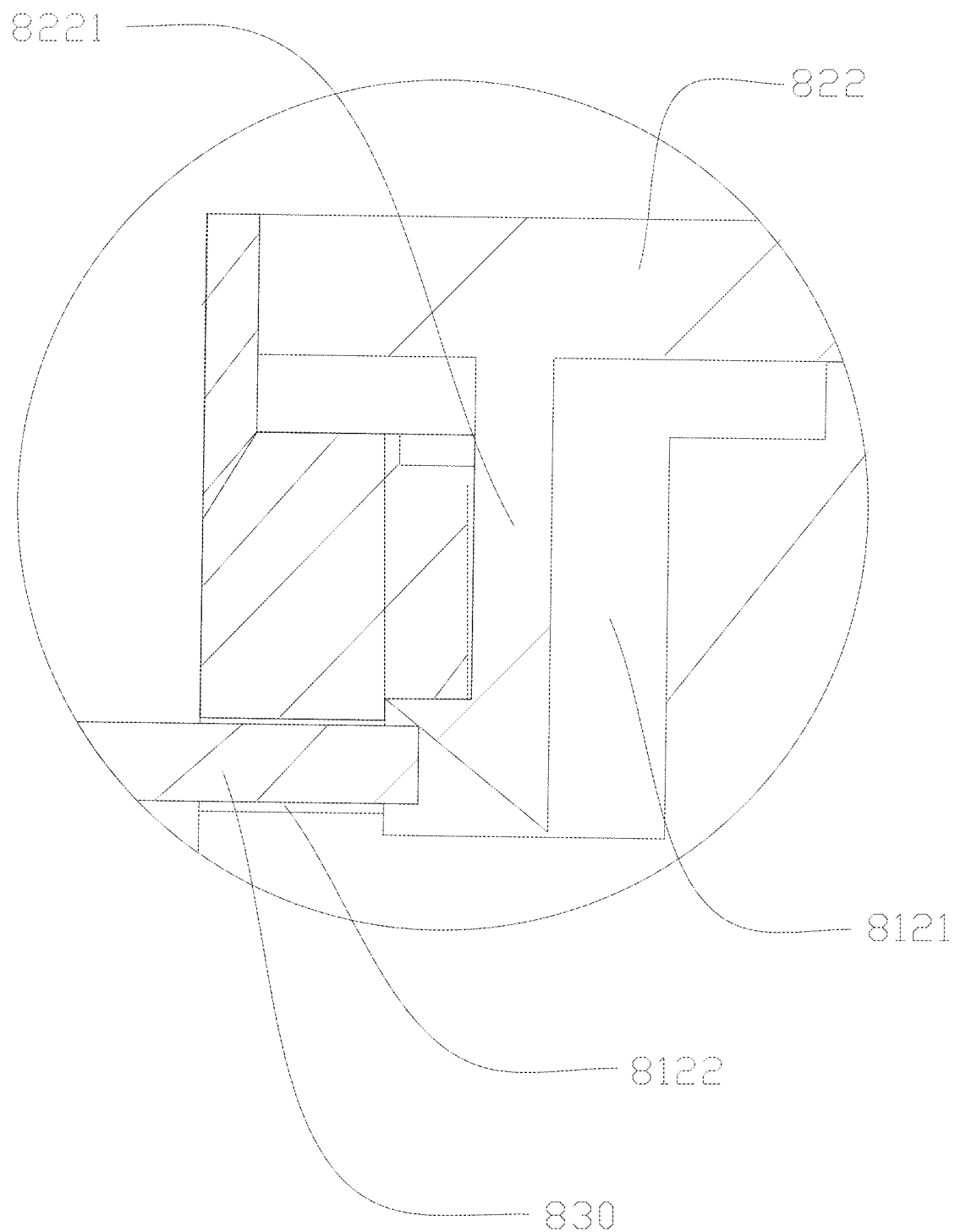
FIG. 3 is an enlarged view of circle A in FIG. 2.
Figure 4:
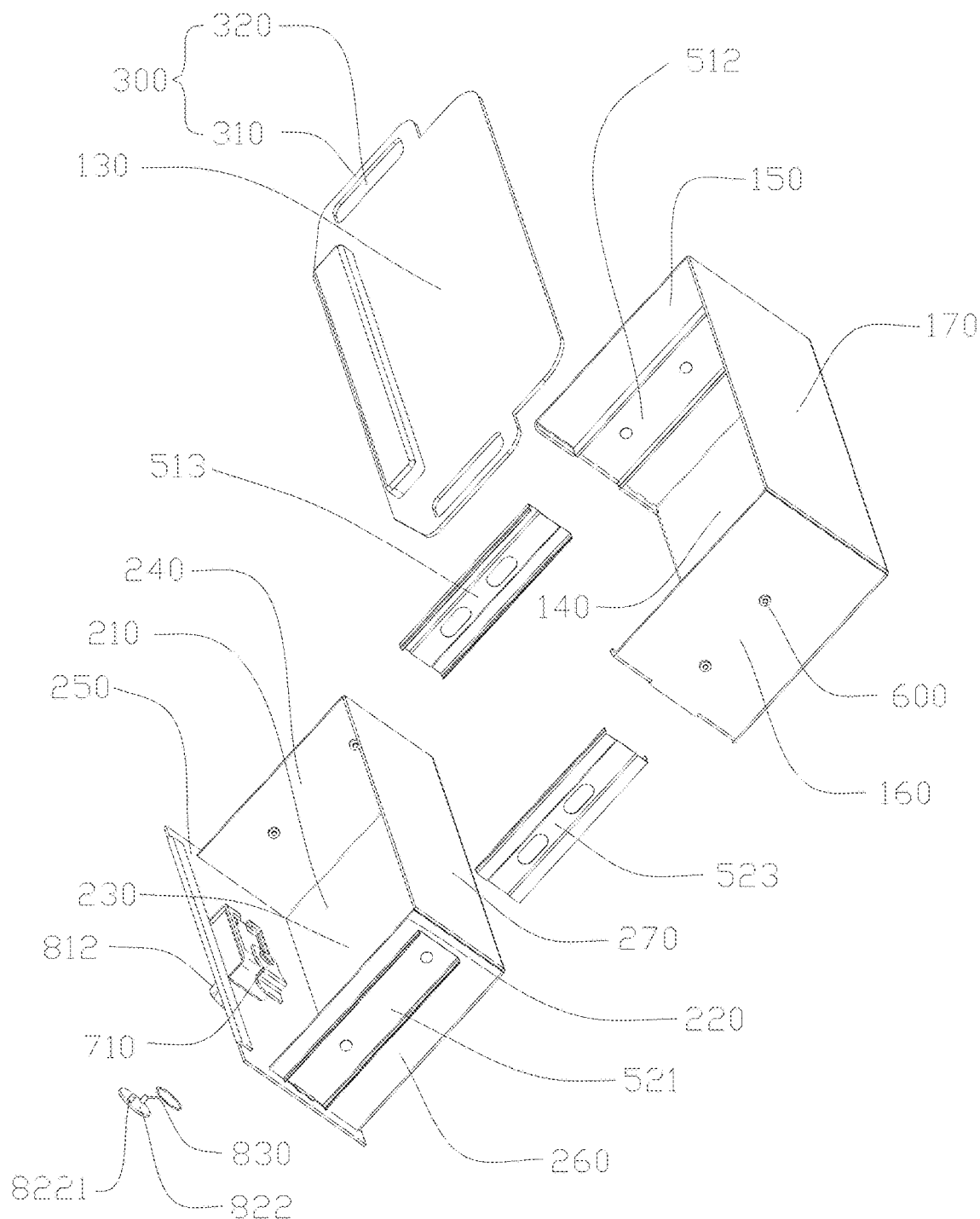
FIG. 4 is a schematic diagram of a first exploded structure according to Embodiment 1 of the present invention.
Figure 5:
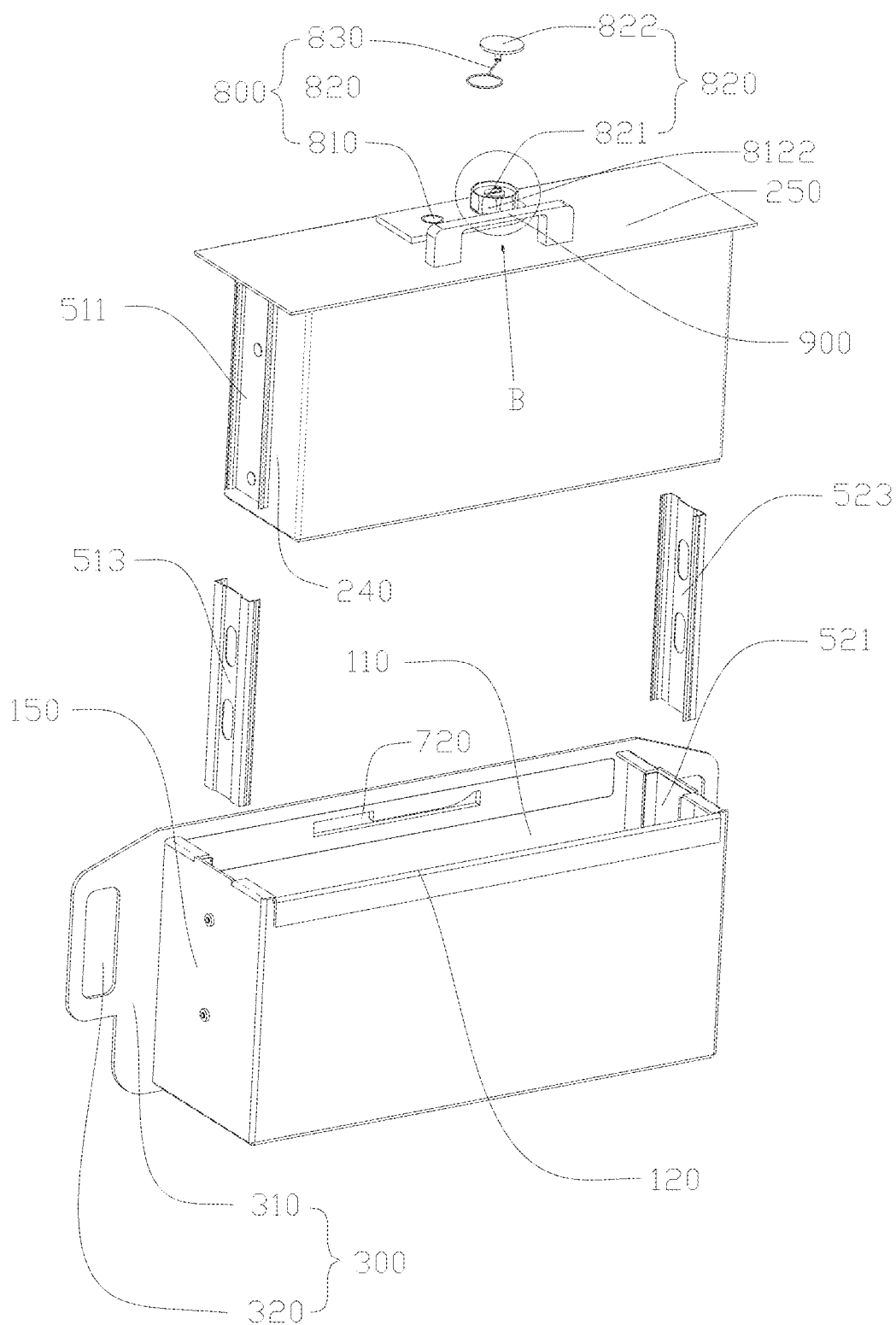
FIG. 5 is a schematic diagram of a second exploded structure according to Embodiment 1 of the present invention.
Figure 6:
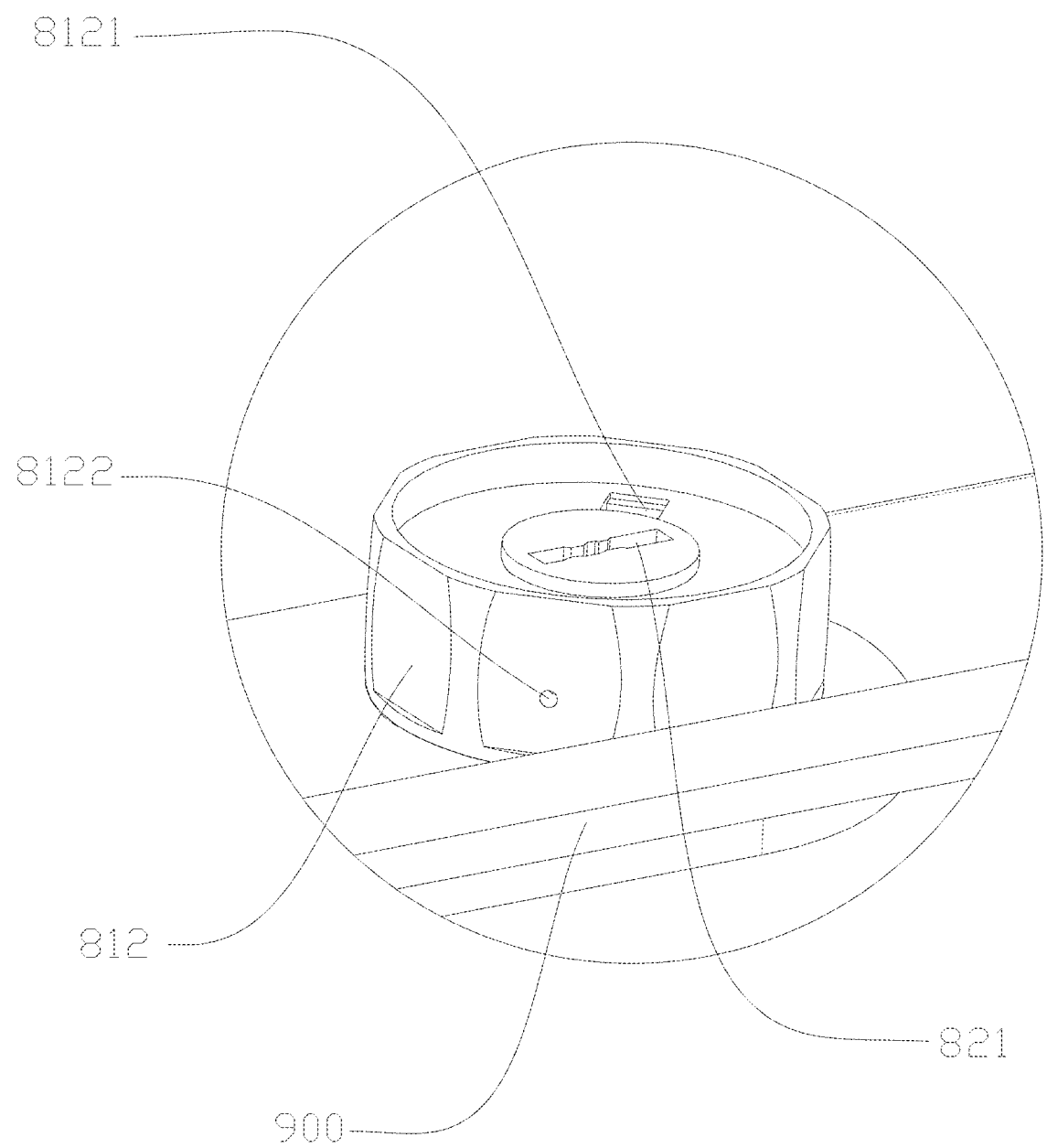
FIG. 6 is an enlarged view of circle B in FIG. 5.
Figure 7:
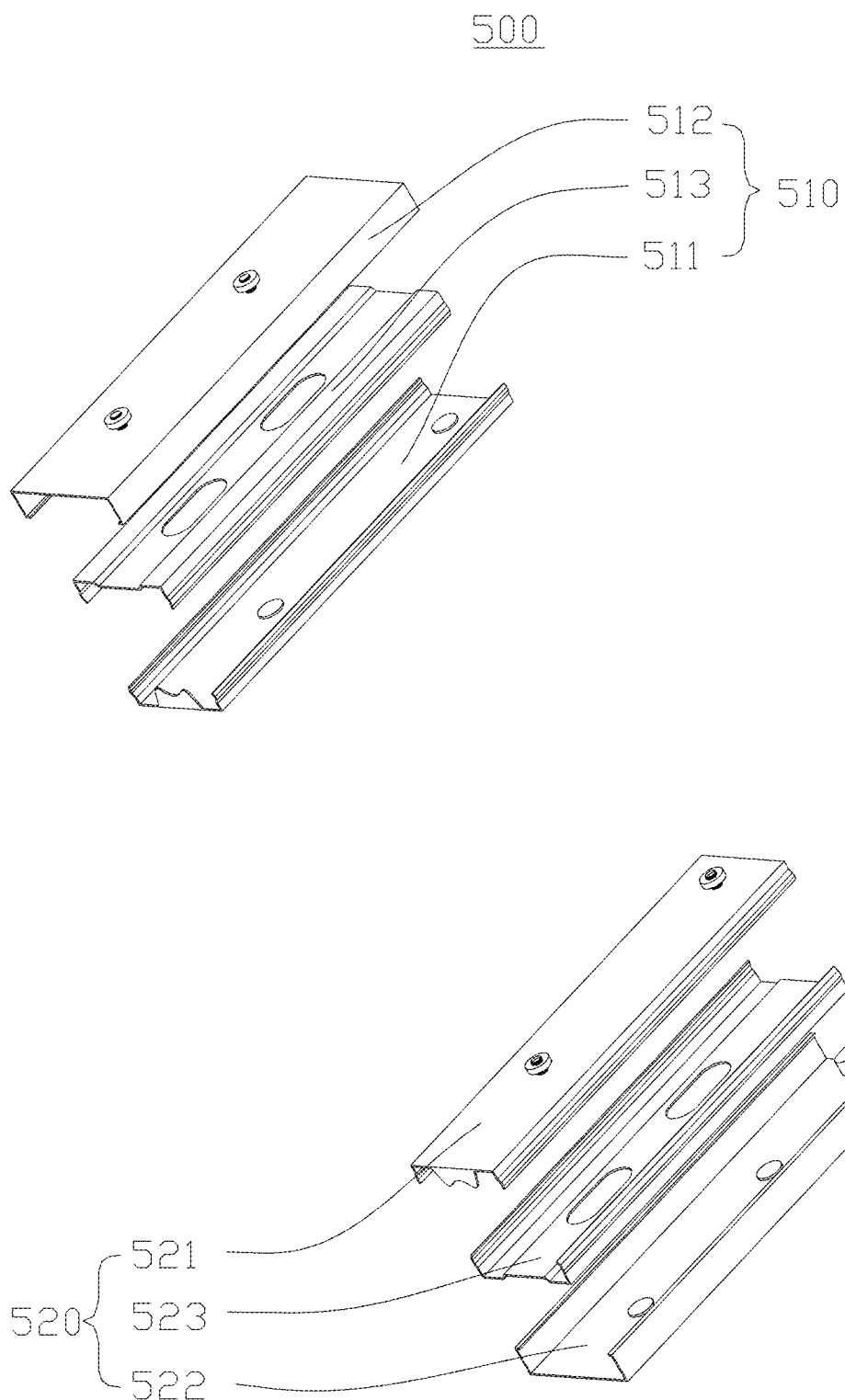
FIG. 7 is a schematic exploded structural diagram of a sliding rail assembly 500 according to the present invention.
Figure 8:
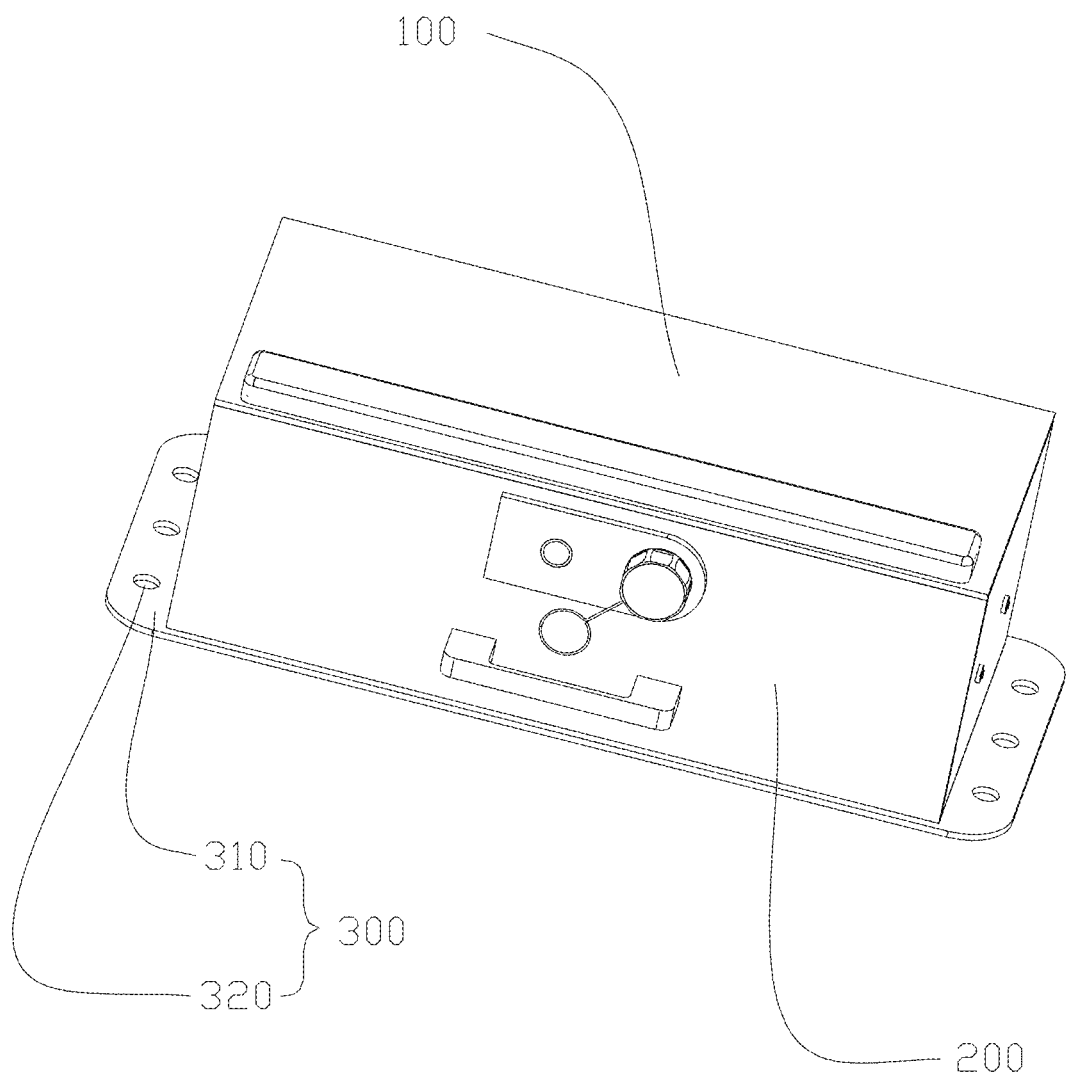
FIG. 8 is a schematic diagram of an entire structure according to Embodiment 2 of the present invention.
Figure 9:
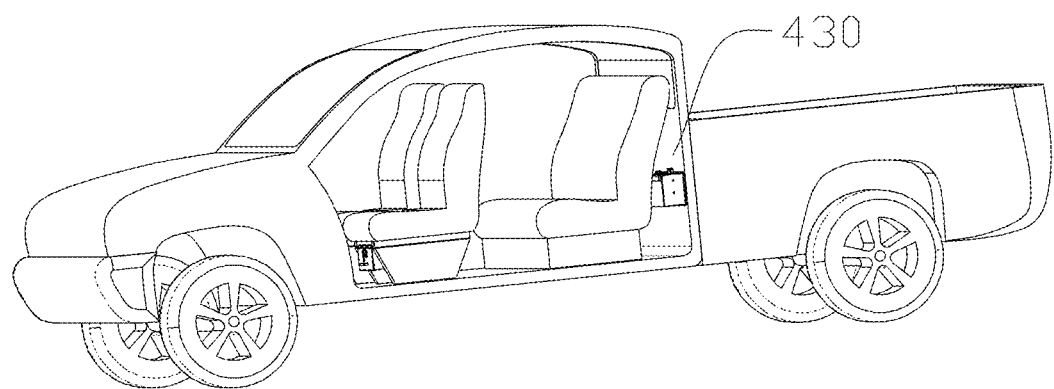
FIG. 9 is a schematic diagram of an entire structure of a vehicle-mounted drawer safe box being mounted on a motor vehicle 400 according to the present invention.
Figure 10:
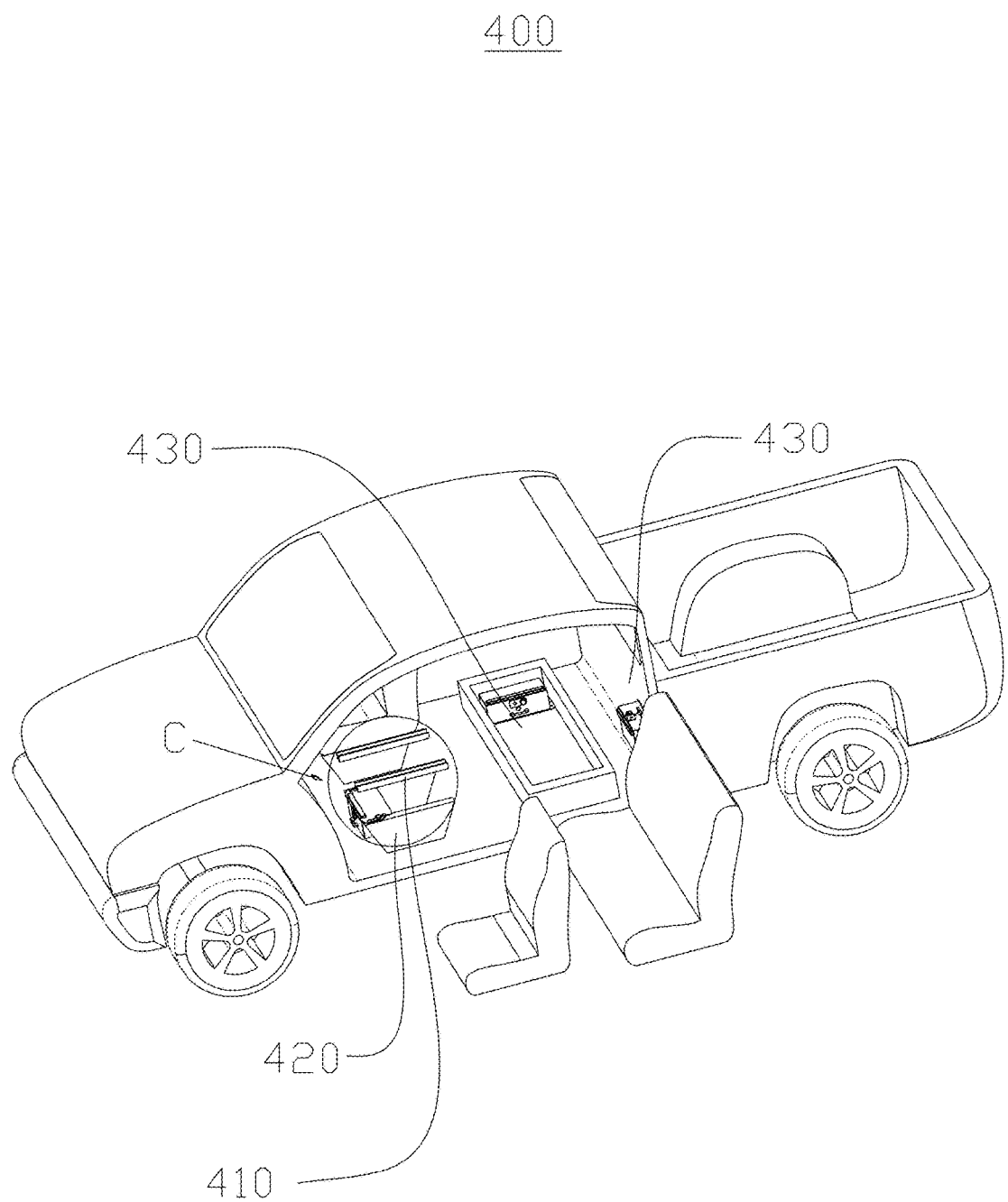
FIG. 10 is a schematic diagram of a partially exploded structure of FIG. 9.
Figure 11:
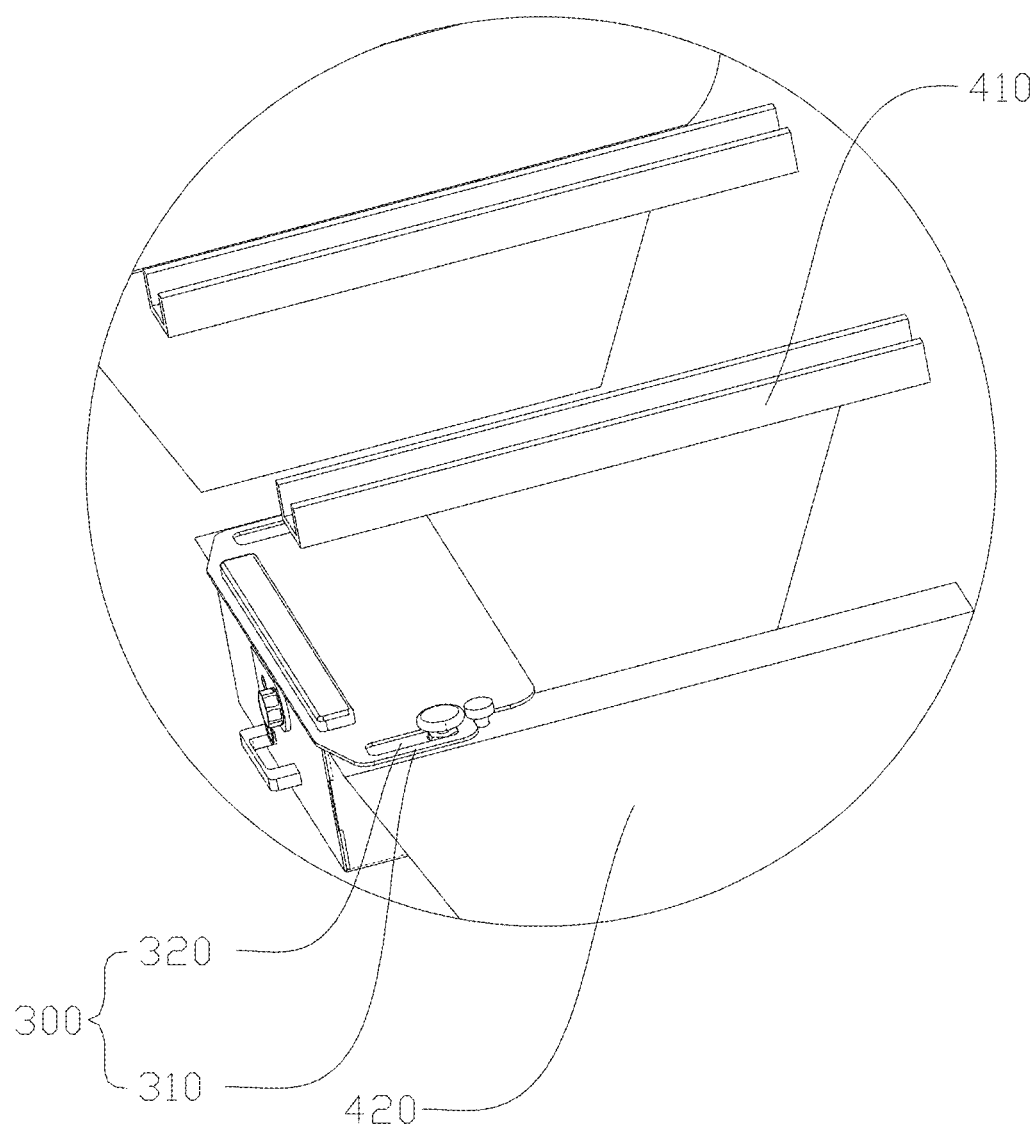
FIG. 11 is an enlarged view of circle C in FIG. 10.

The present invention will be further described in detail below in conjunction with FIG. 1 to FIG. 11.

Embodiment 1

Embodiment 1 of the present invention discloses a vehicle-mounted drawer safe box, configured to be mounted in a motor vehicle 400 to form a safe storage space inside the vehicle. The vehicle-mounted drawer safe box includes an accommodating box body 100, a drawer 200 and a mounting element 300. The accommodating box body 100 is provided with an accommodating cavity 110 and an accommodating opening 120 communicated to the accommodating cavity 110. The drawer 200 is provided with a storage space 210 for accommodating an item and a storage opening 220 communicated to the storage space 210; the drawer 200 is slidably connected to the accommodating box body 100, and the drawer 200 can move between a first position and a second position. When the drawer 200 is in the first position, the storage opening 220 is configured to allow the item to pass through and enter the storage space 210. When the drawer 200 is in the second position, the storage opening 220 is closed by the accommodating box body 100. The mounting element 300 is fixedly connected to the accommodating box body 100, and the mounting element 300 is configured to be fixedly mounted in the motor vehicle 400.

By the arrangement of the above structure, during use, the vehicle-mounted drawer safe box provides a relatively safe storage space inside a vehicle through the proper design of the accommodating box body 100 and the drawer 200, as well as the reliable mounting element 300. In a daily use scenario of the vehicle, damage to the item caused by shaking and collision during movement of the vehicle can be effectively prevented. Meanwhile, a risk of stealing can be also prevented, so that the safety of valuables in the vehicle is ensured. Compared with some traditional vehicle-mounted storage devices that have fixed shapes and are inconvenient to access, due to the drawer design, the drawer safe box can adapt more flexibly to a limited space inside the vehicle. Without occupying an extra space, the drawer safe box is cleverly embedded in an appropriate position, thus achieving a safe storage function without significantly affecting the overall space layout inside the vehicle and the riding comfort. The drawer design further facilitates a user to quickly and conveniently take and place the items. Compared with some storage boxes that are opened only by complex operations or storage spaces that are at fixed positions and are difficult to reach, this structure allows the user to easily take or place the item when the item is needed, thereby improving the efficiency and experience of daily use.

In this embodiment, the mounting element 300 includes a mounting plate 310 and a mounting hole 320; the motor vehicle 400 includes a seat guide rail 410 and a mounting base 420; a lower end surface of the mounting plate 310 is configured to abut against the mounting base 420, and an upper end surface of the mounting plate 310 is configured to abut against the seat guide rail 410; and the mounting hole 320 is matched with the mounting structure of the seat guide rail 410, so that when the seat guide rail 410 is fixedly connected to the mounting base 420, the vehicle-mounted drawer safe box is fixedly mounted between the seat guide rail 410 below a seat of the motor vehicle 400 and the mounting base 420. By the arrangement of the above structure, during use, the vehicle-mounted drawer safe box is mounted by using the existing seat guide rail 410 below the seat of the motor vehicle 400, and the mounting base 420. This fully uses the existing structural space inside the vehicle, thus avoiding additional occupation of other valuable spaces inside the vehicle, and making the space inside the vehicle planned and used more appropriately. Meanwhile, due to the mounting mode designed based on the standard seat guide rail 410 and mounting base 420 of the vehicle, it is relatively easy and fast for mounting personnel to mount the safe box, without performing complex modification or finding a special mounting position, as long as corresponding structures are matched and mounted. This improves the efficiency and convenience of mounting of the vehicle-mounted drawer safe box in the motor vehicle 400. Moreover, this mounting mode tightly and stably fixes the vehicle-mounted drawer safe box under the seat. This position is relatively concealed, which reduces, to an extent, the risk of the safe box being directly discovered and damaged by thieves, and improves the safety of item storage. Moreover, in a driving process of the vehicle, regardless of a complex road condition and a complex driving condition, the stably mounted safe box can maintain its original position, thus providing a reliable storage environment for valuables in the vehicle, and avoiding the problems such as damage to the item caused by shaking of the vehicle or malfunction of the safe box itself. The lower end surface of the mounting plate 310 abuts against the mounting base 420, and the upper end surface abuts against the seat guide rail 410, so that the vehicle-mounted drawer safe box is tightly connected with the seat guide rail 410 of the motor vehicle 400, and the mounting base 420. By the abutment against the two components, the mounting plate 310 can effectively and uniformly distribute and transfer the weight of the safe box to the seat guide rail 410 and the mounting base 420, which ensures that the safe box is in a stable supporting state during the running of the vehicle and may not shake or shift due to its own weight or the vibration of the vehicle. The mounting hole 320 is matched with a mounting structure of the seat guide rail 410. This is a key detail for securely mounting the vehicle-mounted drawer safe box under the seat of the motor vehicle 400. During mounting, the corresponding mounting structure of the seat guide rail 410 is adapted and connected to the mounting hole 320, so that the safe box can form a whole with the seat guide rail 410. This matching design ensures that the vehicle-mounted drawer safe box can be accurately and reliably fixed between the seat guide rail 410 and the mounting base 420 in the process of fixedly connecting the seat guide rail 410 to the mounting base 420, to become a part of the structure under the seat of the vehicle. Moreover, this fixing mode has high connection strength and can withstand various forces generated during the running of the vehicle, such as impact forces caused by acceleration, deceleration, turning, and road bumps, to prevent the safe box from being loosened or falling off, thus ensuring the safety and integrity of the item stored in the safe box.

In this embodiment, the vehicle-mounted drawer safe box further includes a sliding rail assembly 500, wherein the drawer 200 is slidably connected to the accommodating box body 100 through the sliding rail assembly 500. By the arrangement of the above structure, during use, the sliding rail assembly 500 provides a smooth sliding track for the drawer 200, so that the drawer 200 can be easily pulled out or pushed back inside the accommodating box body 100. When a user needs to store or take the item, the user only needs to apply a small force to steadily pull drawer 200. The operation process is very smooth, and the drawer 200 can be moved easily, which greatly improves the convenience of use of the vehicle-mounted drawer safe box. Moreover, the sliding rail assembly 500 has a guidance effect, which can ensure that the drawer 200 slides accurately in a predetermined direction, making it easy for the user to accurately control opening and closing degrees of the drawer 200. Whether the drawer 200 is completely opened to fully use a storage space 210 to place a large item, or the drawer 210 is only partially opened to quickly take a small item, the user can easily locate the drawer 200 according to an own need. Furthermore, during each operation, the drawer 200 may move according to a trajectory set by the sliding rail, with good repeatability and predictability.

In this embodiment, the drawer 200 includes a drawer bottom wall 230, a first side wall 240, a second side wall 250, a third side wall 260, and a fourth side wall 270; the accommodating box body 100 includes a box body top wall 130, a box body bottom wall 140, a fifth side wall 150, a sixth side wall 160, and a seventh side wall 170; the sliding rail assembly 500 includes a first sliding rail assembly 510 and a second sliding rail assembly 520; the first sliding rail assembly 510 and the second sliding rail assembly 520 are symmetrically arranged on the first side wall 240 and the third side wall 260; and the drawer 200 and the accommodating box body 100 are slidably connected through the first sliding rail assembly 510 and the second sliding rail assembly 520. By the arrangement of the above structure, during use, the drawer bottom wall 230 serves as a bottom supporting structure for the drawer 200 and provides a main supporting effect during the placement of an item. The first side wall 240 and the third side wall 260 are directly connected to the sliding rail assembly 500, and are key load-bearing walls for achieving slidable connection of the drawer 200. On the one hand, the first side wall and the third side wall provide lateral supporting and positioning for the drawer 200, which determines the position of the drawer 200 in a left-right direction in the accommodating box body 100 (assuming that the vehicle runs in a front-back direction). This prevents the drawer 200 from shifting or shaking left and right during sliding, and ensures that the drawer 200 can slide along a predetermined linear trajectory. Meanwhile, the first side wall and the third side wall are kept in fit clearance with the corresponding side walls of the accommodating box body 100. If they are too close, normal sliding of the drawer 200 will be affected. If they are too loose, the drawer will have excessive shaking and noises due to the vibration of the vehicle during running. This ensures the stability of the entire structure of the drawer 200 and the smoothness of sliding of the drawer 200. The second side wall 250 and the fourth side wall 270 mainly achieve an effect of defining an internal space of the drawer 200, and form the relatively closed storage space 210 together with other side walls to store the item and prevent the item from falling out from a side surface of the drawer 200. The box body top wall 130 achieves an effect of closing a top of an internal space of the box body 100, to prevent dust, debris, and the like from falling into a space between the drawer 200 and the box body from the top to affect the normal sliding of the drawer 200 and the protective effect on the item. The box body bottom wall 140 is used as a bottom supporting structure for the entire accommodating box body 100, to bear the weight of the accommodating box body 100 itself and the total weight of the drawer 200 and the item stored in the drawer. The box body bottom wall needs to have enough strength and stability. The fifth side wall 150, the sixth side wall 160, and the seventh side wall 170 jointly define an external contour and internal space of the accommodating box body 100, and cooperate with the corresponding side walls of the drawer 200 to determine a sliding range and positional relationship of the drawer 200 in the accommodating box body 100. The fifth side wall, the sixth side wall, and the seventh side wall can resist an external force such as external collision and compression during the running of the vehicle, to protect the drawer 200 and the item stored inside from being damaged, and a stable environment and guidance are also provided for the smooth sliding of the drawer 200. The first sliding rail assembly 510 and the second sliding rail assembly 520 are symmetrically arranged on the first side wall 240 and the third side wall 260 of the drawer 200. This symmetrical layout enables the drawer 200 to receive a uniform supporting force and a uniform guidance force during sliding. From a mechanical perspective, the sliding rails on two sides work together to avoid the problems such as tilting and jamming of the drawer 200 due to a unilateral force, which ensures that drawer 200 can slide steadily and smoothly in a horizontal direction inside the accommodating box body 100. The user can obtain a good operation experience no matter the user quickly pulls the drawer 200 or slowly pushes the drawer 200.

In this embodiment, the first sliding rail assembly 510 includes a first drawer sliding rail 511 and a first fixed sliding rail 512; the second sliding rail assembly 520 includes a second drawer sliding rail 521 and a second fixed sliding rail 522; the first side wall 240 is fixedly connected to the first drawer sliding rail 511; the third side wall 260 is fixedly connected to the second drawer sliding rail 521; the fifth side wall 150 is fixedly connected to the first fixed sliding rail 512; the sixth side wall 160 is fixedly connected to the second fixed sliding rail 522; the first side wall 240 is slidably connected to the fifth side wall 150 through the first drawer sliding rail 511 and the first fixed sliding rail 512; and the third side wall 260 is slidably connected to the sixth side wall 160 through the second drawer sliding rail 521 and the second fixed sliding rail 522. By the arrangement of the above structure, during use, the drawer 200 can slide in a stable and smooth manner inside the accommodating box body 100 through the cooperative cooperation of the first drawer sliding rail 511, the first fixed sliding rail 512, the second drawer sliding rail 521, and the second fixed sliding rail 522. Under a normal running or parking condition of the vehicle, the user can easily pull the drawer 200 to store or take out the item. The operation process is smooth and effortless. The user will not be bothered by the problems such as jamming or unsmoothness of the sliding rails, so that the comfort level and convenience of use of this vehicle-mounted drawer safe box are improved.

In this embodiment, the vehicle-mounted drawer safe box further includes threaded fasteners 600, wherein the first side wall 240 is fixedly connected to the first drawer sliding rail 511 through the threaded fastener 600, and the third side wall 260 is fixedly connected to the second drawer sliding rail 521 through the threaded fastener 600. By the arrangement of the above structure, during use, the threaded fasteners 600 have a high fastening ability. The threaded fasteners 600 can achieve tight and stable connection between the first side wall 240 and the first drawer sliding rail 511, as well as between the third side wall 260 and the second drawer sliding rail 521.

In this embodiment, the fifth side wall 150 is fixedly connected to the first fixed sliding rail 512 through a threaded fastener 600, and the sixth side wall 160 is fixedly connected to the second fixed sliding rail 522 through a threaded fastener 600. By the arrangement of the above structure, during use, the threaded fasteners 600 have a high fastening ability. The threaded fasteners 600 can achieve tight and stable connection between the fifth side wall 150 and the first drawer sliding rail 512, as well as between the sixth side wall 160 and the second drawer sliding rail 522.

In this embodiment, the first sliding rail assembly 510 further includes a first intermediate sliding rail 513; the second sliding rail assembly 520 further includes a second intermediate sliding rail 523; the first drawer sliding rail 511 and the first fixed sliding rail 512 are slidably connected through the first intermediate sliding rail 513; and the second drawer sliding rail 521 and the second fixed sliding rail 522 are slidably connected through the second intermediate sliding rail 523. By the arrangement of the above structure, during use, compared with a two-section sliding rail, a three-section sliding rail allows the drawer 200 to be completely pulled out of the accommodating box body 100, and has a higher load-bearing capacity. The first intermediate sliding rail 513 and the second intermediate sliding rail 523 can further improve the smoothness and flexibility of operation, which helps the vehicle-mounted drawer safe box to better function inside the motor vehicle 400, to provide the user with a better use experience.

In this embodiment, the vehicle-mounted drawer safe box further includes a locking assembly 700, wherein the locking assembly 700 includes a locking piece 710 and a locking slot 720; and the locking piece 710 and the locking slot 720 cooperate with each other to keep the drawer 200 in a locked state or an unlocked state at the second position. By the arrangement of the above structure, during use, this locking design plays an anti-theft role to an extent. Even if a thief has the opportunity to touch the vehicle-mounted drawer safe box, the thief cannot separate the locking piece 710 from the locking slot 720 without a correct unlocking mode, and the drawer 200 cannot be opened, thus protecting valuables inside the drawer 200 from being easily stolen and providing an additional defense line for the safety of items inside the vehicle.

In this embodiment, the locking piece 710 is arranged on the second side wall 250, and the locking slot 720 is provided in the box body top wall 130. By the arrangement of the above structure, during use, the locking piece 710 is arranged on the second side wall 250 of the drawer 200, and the locking slot 720 is arranged on the box body top wall 130 of the accommodating box body 100. This fully uses the structural spaces of the drawer 200 and the box body, without occupying an additional space, for placing items, inside the drawer 200, and without interfering with the layout of the sliding rail assembly 500 and other structures. Moreover, this layout mode can ensure that the locking piece 710 and locking slot 720 do not interfere with the sliding trajectory of the drawer 200 when the drawer 200 slides back and forth along the sliding rail assembly 500, which ensures that the drawer 200 can be opened and closed smoothly and maintains the convenience and smoothness of operation of the vehicle-mounted drawer safe box.

In this embodiment, the locking assembly 700 further includes a control lock cylinder 730; and the control lock cylinder 730 is configured to control rotation of the locking piece 710 between a locking position and an unlocking position. By the arrangement of the above structure, during use, the control lock cylinder 730 provides the user with a relatively centralized and clear operation entrance to manage locking and unlocking of the drawer 200.

In this embodiment, the vehicle-mounted drawer safe box further includes an unlocking system 800, wherein the unlocking system 800 controls the locking piece 710 to rotate between the locking position and the unlocking position by controlling the control lock cylinder 730. By the arrangement of the above structure, during use, the unlocking system 800 can control the control lock cylinder 730, which means that various unlocking modes can be integrated, to meet different user needs and different usage scenarios.

In this embodiment, the unlocking system 800 includes a fingerprint unlocking assembly 810 and a mechanical unlocking assembly 820; and both the fingerprint unlocking assembly 810 and the mechanical unlocking assembly 820 can independently control the locking piece 710 to rotate between the locking position and the unlocking position by controlling the control lock cylinder 730. By the arrangement of the above structure, during use, the coexistence of the two unlocking modes is equivalent to adding a redundant design to the entire unlocking system 800, thus improving the fault tolerance of the system. Even if one of the unlocking modes fails or cannot be used normally for some reasons, the other mode can still ensure the normal unlocking function of the safe box, thereby reducing the risk that the safe box cannot be used due to unlocking, and further ensuring that the vehicle-mounted drawer safe box can reliably provide a safe storage service inside the motor vehicle 400 for the user.

In this embodiment, the fingerprint unlocking assembly 810 includes a fingerprint recognition assembly 811 and an unlocking knob 812; the unlocking knob 812 includes a rotatable state and a locked state; the fingerprint recognition assembly 811 is configured to control the unlocking knob 812 to switch between the rotatable state and the locked state; when the unlocking knob 812 is in the rotatable state, the unlocking knob 812 can control the locking piece 710 to rotate between the locking position and the unlocking position; and when the unlocking knob 812 is in the locked state, the unlocking knob 812 cannot control the locking piece 710 to rotate between the locking position and the unlocking position. By the arrangement of the above structure, during use, the intelligent identity verification function of the fingerprint recognition assembly 811 is combined with the mechanical operation mode of the unlocking knob 812, which not only exerts the fast, accurate, and secure characteristics of fingerprint recognition, but also retains the advantages of manual rotation of the knob, which is intuitive, reliable, and in line with traditional operation habits. This integration makes the entire unlocking process both intelligent and user-friendly, thus meeting the dual needs of different users for high-tech experience and traditional operation feel. The safety is improved, and the convenience and comfort level of use are improved.

In this embodiment, the mechanical unlocking assembly 820 includes a mechanical lock hole 821 and a hidden lock cover 822; the mechanical lock hole 821 is provided inside the unlocking knob 812; and the hidden lock cover 822 is configured to hide the mechanical lock hole 821. By the arrangement of the above structure, during use, the comprehensive protection capability of the vehicle-mounted drawer safe box is improved from the perspective of burglary prevention and misoperation prevention by hiding the mechanical lock hole 821 through the hidden lock cover 822 and the reliability of the mechanical lock hole 821 serving as a backup unlocking mode. Safe storage of the item is ensured, and the user can use the product more trustingly, without worrying about issues that the safe box cannot be opened due to various unexpected situations, thereby increasing the trust and satisfaction of the user with the product.

In this embodiment, a clamping slot 8121 is provided in the unlocking knob 812; the clamping slot 8121 is symmetrically arranged around the mechanical lock hole 821; the hidden lock cover 822 is provided with a clamping plate 8221; the clamping plate 8221 corresponds to the clamping slot 8121; and the clamping slot 8121 is in clamping connection with the clamping plate 8221 to cover the hidden lock cover 822 and hide the mechanical lock hole 821. By the arrangement of the above structure, during use, the clamping slot 8121 is symmetrically arranged around the mechanical lock hole 821, and the clamping plate 8221 correspondingly arranged on the hidden lock cover 822 is in clamping connection with the clamping slot, so that the hidden lock cover 822 can be stably adhered to an end surface of the unlocking knob 812 and completely cover the mechanical lock hole 821, thereby maintaining effective concealment of the mechanical lock hole 821.

In this embodiment, the unlocking knob 812 is further provided with a cover separation hole 8122; the mechanical unlocking assembly 820 further includes a cover separation ejector pin 830; the cover separation hole 8122 is arranged at a bottom of the clamping slot 8121; when the clamping slot 8121 is in clamping connection with the clamping plate 8221, the cover separation ejector pin 830 is used to pass through the cover separation hole 8122 and apply a pressure to the clamping plate 8221 to release the hidden lock cover 822 from a clamped state. By the arrangement of the above structure, during use, the cover separation hole 8122 is provided in the unlocking knob 812, and the cover separation ejector pin 830 is prepared specifically for releasing the hidden lock cover 822 from the clamped state. This provides the user with a clear and targeted operation mode to open the hidden lock cover 822. When the mechanical unlocking assembly 820 needs to be used for unlocking, the user does not need to struggle to figure out how to remove the hidden lock cover 822. The user only needs to use the cover separation ejector pin 830 to pass through the cover separation hole 8122 and apply a pressure to the clamping plate 8221. The hidden lock cover 822 can be easily released from the clamped state according to a designed operation procedure, to touch the mechanical lock hole 821, thereby reducing the difficulty of opening the hidden lock cover 822 and further improving the efficiency of using the backup unlocking mode.

In this embodiment, the vehicle-mounted drawer safe box further includes a grip 900. The grip 900 is fixedly connected to an outer side of the second side wall 250. By the arrangement of the above structure, during use, the grip 900 provides a clear and comfortable point of force application for the user. When it is necessary to open the drawer 200 of the vehicle-mounted drawer safe box, the user can naturally hold the grip 900 and easily pull the drawer 200 out of the accommodating box body 100 by applying a pulling force with the hand.

Embodiment 2

A difference between this embodiment and Embodiment 1 is that the mounting element 300 of Embodiment 1 is fixedly connected to the box body top wall 130. Furthermore, the lower end surface of the mounting plate 310 of Embodiment 1 abuts against the mounting base 420, and the upper end surface of the mounting plate 310 abuts against the seat guide rail 410. The mounting hole 320 is matched with the mounting structure of the seat guide rail 410, so that when the seat guide rail 410 is fixedly connected to the mounting base 420, the vehicle-mounted drawer safe box is fixedly mounted between the seat guide rail 410 below the seat of the motor vehicle 400, and the mounting base 420. In this embodiment, the mounting element 300 is fixedly connected to the box body bottom wall 140, and the mounting plate 310 abuts against the mounting plane 430. A size of the mounting hole 320 is matched with a size of a mounting fastener, so that the vehicle-mounted drawer safe box is fixedly mounted on the mounting plane 430 of the motor vehicle 400.

In this embodiment, the mounting element 300 includes a mounting plate 310 and a mounting hole 320, and the motor vehicle 400 includes a mounting plane 430. The mounting plate 310 abuts against the mounting plane 430; and the size of the mounting hole 320 is matched with the size of the mounting fastener, so that the vehicle-mounted drawer safe box is fixedly mounted on the mounting plane 430 of the motor vehicle 400. By the arrangement of the above structure, during use, the vehicle-mounted drawer safe box can be stably and reliably mounted on the mounting plane 430 of the motor vehicle 400 through the coordinated cooperation between the mounting plate 310 and the mounting hole 320. During daily running of the vehicle, under both a bumpy road condition or a complex driving operation, the safe box can remain in place and will affect a storage state of an item inside by external interference, thus providing a safe storage environment for valuables in the vehicle and lowering the risk of damage to or loss of an item due to movement of the vehicle.

In this embodiment, the mounting plane 430 is arranged below the seat or on a wall, close to a rear seat, in the motor vehicle 400. Being below the seat or the wall, close to the rear seat, in motor vehicle 400 is usually a relatively open and underutilized area inside the vehicle. The mounting plane 430 is arranged here, which can cleverly embed the vehicle-mounted drawer safe box into this space, thereby avoiding additional occupation of a valuable aisle in the vehicle, an activity space for the feet or the like, or other areas for placing commonly used items, and maximizing the effective utilization of the limited space inside the vehicle. Furthermore, without changing a normal adjustment function of the seat and a normal sitting posture of a passenger, the safe box is mounted below the seat or on the wall, close to the rear seat, in the motor vehicle 400, which will not have a significant impact on leg extension of the passenger and the riding comfort level. The passenger can still use the seat normally and enjoy a comfortable riding experience.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. A vehicle-mounted drawer safe box, configured to be mounted in a motor vehicle to form a safe storage space inside the vehicle, and comprising:
   an accommodating box body, wherein the accommodating box body is provided with an accommodating cavity and an accommodating opening communicated to the accommodating cavity;
   a drawer, wherein the drawer is provided with a storage space for accommodating an item and a storage opening communicated to the storage space; the drawer is slidably connected to the accommodating box body and moves between a first position and a second position; when the drawer is in the first position, the storage opening is configured to allow the item to pass through and enter the storage space; when the drawer is in the second position, the storage opening is closed by the accommodating box body;
   a mounting element, wherein the mounting element is fixedly connected to the accommodating box body, and the mounting element is configured to be fixedly mounted in the motor vehicle; and
   a locking assembly, wherein the locking assembly comprises a locking piece and a locking slot; and the locking piece and the locking slot cooperate with each other to keep the drawer in a locked state or an unlocked state at the second position;
   wherein the locking assembly further comprises a control lock cylinder; the vehicle-mounted drawer safe box further comprises an unlocking system,
   wherein the unlocking system controls the locking piece to rotate between the locking position and the unlocking position by controlling the control lock cylinder;
   wherein the unlocking system comprises a fingerprint unlocking assembly and a mechanical unlocking assembly; and both the fingerprint unlocking assembly and the mechanical unlocking assembly independently control the locking piece to rotate between the locking position and the unlocking position by controlling the control lock cylinder;
   wherein the fingerprint unlocking assembly comprises a fingerprint recognition assembly and an unlocking knob; the unlocking knob comprises a rotatable state and a locked state; the fingerprint recognition assembly is configured to control the unlocking knob to switch between the rotatable state and the locked state;
   when the unlocking knob is in the rotatable state, the unlocking knob controls the locking piece to rotate between the locking position and the unlocking position; and when the unlocking knob is in the locked state, the unlocking knob does not control the locking piece to rotate between the locking position and the unlocking position;
   wherein the mechanical unlocking assembly comprises a mechanical lock hole and a hidden lock cover; the mechanical lock hole is provided inside the unlocking knob; and the hidden lock cover is configured to hide the mechanical lock hole;
   wherein a clamping slot is provided in the unlocking knob; the clamping slot is symmetrically arranged around the mechanical lock hole; the hidden lock cover is provided with a clamping plate; the clamping plate corresponds to the clamping slot; and the clamping slot is in clamping connection with the clamping plate to cover the hidden lock cover and hide the mechanical lock hole.

2. The vehicle-mounted drawer safe box according to claim 1,
   wherein the mounting element comprises a mounting plate and a mounting hole;
   the motor vehicle comprises a seat guide rail and a mounting base; a lower end surface of the mounting plate is configured to abut against the mounting base, and an upper end surface of the mounting plate is configured to abut against the seat guide rail; and the mounting hole is matched with the mounting structure of the seat guide rail, so that when the seat guide rail is fixedly connected to the mounting base, the vehicle-mounted drawer safe box is fixedly mounted between the seat guide rail below a seat of the motor vehicle and the mounting base.

3. The vehicle-mounted drawer safe box according to claim 1,
   wherein the mounting element comprises a mounting plate and a mounting hole;
   the motor vehicle comprises a mounting plane; the mounting plate is configured to abut against the mounting plane; a size of the mounting hole is matched with a size of a mounting fastener, so that the vehicle-mounted drawer safe box is fixedly mounted on the mounting plane of the motor vehicle.

4. The vehicle-mounted drawer safe box according to claim 3,
wherein the mounting plane is arranged below the seat or on a wall, close to a rear seat, in the motor vehicle.

5. The vehicle-mounted drawer safe box according to claim 1, further comprising a sliding rail assembly, wherein the drawer is slidably connected to the accommodating box body through the sliding rail assembly.

6. The vehicle-mounted drawer safe box according to claim 5,
wherein the drawer comprises a drawer bottom wall, a first side wall, a second side wall, a third side wall, and a fourth side wall; the accommodating box body comprises a box body top wall, a box body bottom wall, a fifth side wall, a sixth side wall, and a seventh side wall; the sliding rail assembly comprises a first sliding rail assembly and a second sliding rail assembly; the first sliding rail assembly and the second sliding rail assembly are symmetrically arranged on the first side wall and the third side wall; and the drawer and the accommodating box body are slidably connected through the first sliding rail assembly and the second sliding rail assembly.

7. The vehicle-mounted drawer safe box according to claim 6,
wherein the first sliding rail assembly comprises a first drawer sliding rail and a first fixed sliding rail; the second sliding rail assembly comprises a second drawer sliding rail and a second fixed sliding rail; the first side wall is fixedly connected to the first drawer sliding rail; the third side wall is fixedly connected to the second drawer sliding rail; the fifth side wall is fixedly connected to the first fixed sliding rail; the sixth side wall is fixedly connected to the second fixed sliding rail; the first side wall is slidably connected to the fifth side wall through the first drawer sliding rail and the first fixed sliding rail; and the third side wall is slidably connected to the sixth side wall through the second drawer sliding rail and the second fixed sliding rail.

8. The vehicle-mounted drawer safe box according to claim 7, further comprising threaded fasteners, wherein the first side wall is fixedly connected to the first drawer sliding rail through the threaded fastener, and the third side wall is fixedly connected to the second drawer sliding rail through the threaded fastener.

9. The vehicle-mounted drawer safe box according to claim 7,
wherein the fifth side wall is fixedly connected to the first fixed sliding rail through a threaded fastener, and the sixth side wall is fixedly connected to the second fixed sliding rail through a threaded fastener.

10. The vehicle-mounted drawer safe box according to claim 6,
wherein the first sliding rail assembly further comprises a first intermediate sliding rail; the second sliding rail assembly further comprises a second intermediate sliding rail; the first drawer sliding rail and the first fixed sliding rail are slidably connected through the first intermediate sliding rail; and the second drawer sliding rail and the second fixed sliding rail are slidably connected through the second intermediate sliding rail.

11. The vehicle-mounted drawer safe box according to claim 6, wherein the locking piece is arranged on the second side wall;
and the locking slot is arranged on the box body top wall.

12. The vehicle-mounted drawer safe box according to claim 1, wherein the unlocking knob is further provided with a cover separation hole; the mechanical unlocking assembly further comprises a cover separation ejector pin; the cover separation hole is arranged at a bottom of the clamping slot; when the clamping slot is in clamping connection with the clamping plate, the cover separation ejector pin is used to pass through the cover separation hole and apply a pressure to the clamping plate to release the hidden lock cover from a clamped state.

13. The vehicle-mounted drawer safe box according to claim 6, further comprising a grip, wherein the grip is fixedly connected to an outer side of the second side wall.

\* \* \* \* \*